United States Patent [19]

Hess et al.

[11] 3,983,032

[45] Sept. 28, 1976

[54] BRINE DESALINATION PROCESS WITH PHASE-BREAKING BY COLD HYDROCARBON INJECTION

[75] Inventors: Howard V. Hess, Glenham; William F. Franz, Gardiner, both of N.Y.

[73] Assignee: Texaco Inc., New York, N.Y.

[22] Filed: Jan. 30, 1975

[21] Appl. No.: 545,269

[52] U.S. Cl. .............................. 210/22 R; 210/21
[51] Int. Cl.² ...................................... B01D 11/00
[58] Field of Search ................... 210/21, 22, 59, 65

[56] References Cited
UNITED STATES PATENTS

| | | | |
|---|---|---|---|
| 3,308,063 | 3/1967 | Hess et al. ......................... | 210/21 X |
| 3,350,299 | 10/1967 | Hess et al. ......................... | 210/21 X |
| 3,350,300 | 10/1967 | Hess et al. ......................... | 210/21 X |

*Primary Examiner*—Frank A. Spear, Jr.
*Attorney, Agent, or Firm*—Thomas H. Whaley; Carl G. Ries

[57] ABSTRACT

Described is an improvement in a water desalination process comprising extracting salt water with a hydrocarbon to form a salt-water hydrocarbon phase having a temperature of 500° to 650° F wherein the phase is broken into salt-free water and hydrocarbon by injecting therein a hydrocarbon at a temperature of 70° to 200° F.

5 Claims, 1 Drawing Figure

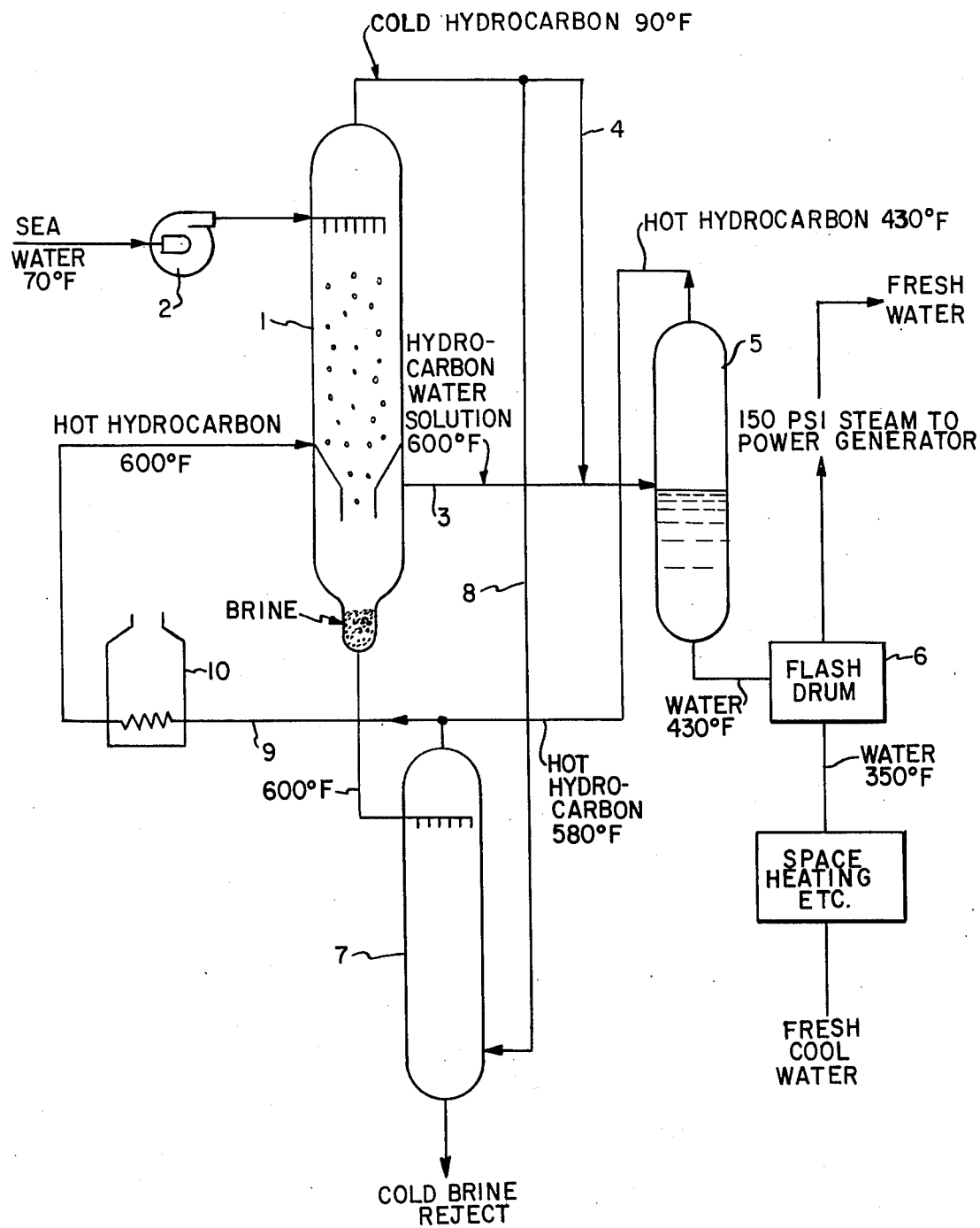

BRINE DESALINATION PROCESS WITH PHASE-BREAKING BY COLD HYDROCARBON INJECTION

BACKGROUND OF THE INVENTION

1. Field of the Invention

The present invention relates to an improvement in a process for producing fresh water from brine by extraction with hydrocarbon and evaporation.

2. Description of the Prior Art

The basic process with which this invention is concerned is described in several patents including coassigned U.S. Pat. No. 3,392,089 issued Jul. 9, 1968.

This process, which is a high pressure-high temperature liquid-liquid extraction of fresh water, is capital intensive because it requires a high pressure indirect heat exchanger (shell and tube) to cool down the hydrocarbon-water solution so that the solution formed during the extraction step separates into a hydrocarbon layer and an essentially salt-free water layer.

SUMMARY OF THE INVENTION

The present invention improves upon the above described process by eliminating the need for a heat exchanger. In accordance with the invention, the hydrocarbon-water solution is cooled by injection with a hydrocarbon at a temperature of 70° to 200°F.

BRIEF DESCRIPTION OF THE DRAWING

In the drawing, the single FIGURE illustrates diagrammatically an arrangement of an apparatus suitable for carrying the invention.

DISCLOSURE

The term "brine" is used herein in a broad sense to denote the entire range of concentrations of aqueous solutions of water soluble inorganic compounds, for example, natural saline water containing sodium chloride, including brackish water, sea water, and saturated or nearly saturated brines, such as the brine in the Great Salt Lake or brines obtained from wells. In addition to sodium chloride-containing solutions, other brines to which the process may be applied include aqueous solutions of dissolved mineral salts, for examples, halides, carbonates and sulfates of sodium, potassium, lithium, calcium, magnesium, zinc and copper.

Normally liquid hydrocarbons are generally suitable for use in the process of this invention. Hydrocarbons and mixtures of hydrocarbons containing from 6 to 30 carbon atoms per molecule are preferred. Various petroleum fractions including kerosene, naphtha, odorless spirits, gasoline, and lubricating oils may be used. Examples of individual hydrocarbon types which can be used in the process of the present invention either alone or in admixture with one another, are the aliphatic hydrocarbons, including hexane, 2,3-dimethylbutane, heptanes, octanes, isooctane, nonanes, decanes, propylene tetramer, hexadecane, 2-methyl-1-pentene, etc; alicyclic hydrocarbons, e.g., methylcyclopentane, cyclohexane, methylcyclohexane, dimethylcyclohexane, ethylcyclohexane, tetralin, isopropylcyclohexane, pinene, etc; and aromatic hydrocarbons, e.g., benzene, cumene, xylenes, methylnaphthalenes, etc.

The preferred hydrocarbons are those which have low toxicity and low solubility in water at temperatures in the range of 200° to 350°F. at moderate pressure. In general, the saturated hydrocarbons, especially the paraffins, are preferred for use in the present process.

EXAMPLE

Referring to the drawing, in an example of the successful practice of the invention 100 volumes of sea water, 220 volumes of hydrocarbon are passed through the extraction system to produce 90 volumes of fresh water and 10 volumes of cold brine reject.

The sea water is pumped up to systems pressure by pump 2 and enters the preheat section of a tubular contacting zone or tower 1 where it is heated to between 500° and 650°F but preferably 600°F., by countercurrent direct heat exchange. The fresh water dissolves in the hydrocarbon to give a 50—50 solution of hydrocarbon and water (200 volumes) which passes from the trap tray through line 3 at a temperature range of 500°–650°F and a pressure range of 700–2500 psig, preferably 600°F and 2000 psig. Cold hydrocarbon (95 to 150 volumes) at a temperature range of 70° to 200°F is injected into line 3 to reduce the temperature of the hydrocarbon water system to around 430°F and accomplish the phase break in vessel 5. The hydrocarbon used can be the same as that used before or another meeting the previously outlined requirements. Water from the bottom of vessel 5 passes to a flash drum 6 where it is flash evaporated at a pressure of between 100 and 300 psig but preferably at 150 psig to yield steam which is used for power generation. The heat content in the water from the bottom of the flash drum can be used for example for space heating, for vaporization of liquid natural gas, for supplying heat to greenhouses, for supplying heat to ponds used to grow fish, etc. and would finally be rejected as cool potable water. The final cooling of the water will depend on large extent on the location of the desalting plant. The steam, after use for power generation can be recovered as fresh water.

The hot brine (10 volumes) is drawn down from tubular extraction tower 1 into tower 7 which is a direct countercurrent heat exchange tower. Here the hot brine is cooled with 20 volumes of cold hydrocarbon from line 8. Cold brine is rejected from tower 7. Hot hydrocarbon from the top of settler or phase breaker 5 is caused to flow through line 9 and is combined with the hot hydrocarbon from the top of vessel 7 and passed through the heater 10 where the hydrocarbon is heated to around 600°F for use in the extraction step.

The foregoing disclosure is representative of a preferred form of the invention and is to be interpreted in an illustrative rather than in a limiting sense. Consequently the invention is to be accorded the full scope the claims appended hereto.

What is claimed is:

1. In a process for extracting fresh water from brine by passing said brine into countercurrent contact with hot hydrocarbon under pressure of 700 to 2500 psig at temperature of 500° to 650°F in a first contacting zone whereby a hydrocarbon-water solution is formed as well as concentrated brine and a cooled recycle hydrocarbon at a temperature of 70° to 200°F the improvement which consists in injecting said solution directly with substantially all of said cooled hydrocarbon to cause said solution to separate into water and hydrocarbon and separating said water from said hydrocarbon.

2. The process of claim 1 wherein said hydrocarbon contains from 6 to 30 carbon atoms per molecule.

3. The process of claim 1 wherein 200 volumes of said solution are injected with 95 to 150 volumes of said hydrocarbon at a temperature of 70° to 200°F to obtain water and a hydrocarbon having a temperature higher than 70° to 200°F.

4. The process of claim 1 wherein said water is flash evaporated at a pressure of between 100 and 300 psig to form steam suitable for power generation.

5. The process of claim 1 wherein said concentrated brine is brought into counter current contact with said cool hydrocarbon to cool said brine and heat said hydrocarbon for recycle.

* * * * *